United States Patent
Olsen

(10) Patent No.: US 9,139,273 B2
(45) Date of Patent: Sep. 22, 2015

(54) METHOD FOR MANUFACTURING A MEMBRANE MATERIAL

(75) Inventor: Claus Olsen, Aabenraa (DK)

(73) Assignee: ELVSTROM SAILS A/S, Aabenraa (DK)

( * ) Notice: Subject to any disclaimer, the term of this patent is extended or adjusted under 35 U.S.C. 154(b) by 62 days.

(21) Appl. No.: 13/267,449

(22) Filed: Oct. 6, 2011

(65) Prior Publication Data
US 2012/0088065 A1 Apr. 12, 2012

(30) Foreign Application Priority Data
Oct. 6, 2010 (DK) ................................ 2010 00907

(51) Int. Cl.
*B63H 9/06* (2006.01)
*B32B 37/00* (2006.01)
(Continued)

(52) U.S. Cl.
CPC ........ *B63H 9/0657* (2013.01); *B29C 66/00145* (2013.01); *B32B 3/085* (2013.01); *B32B 3/266* (2013.01); *B32B 7/04* (2013.01); *B32B 27/08* (2013.01); *B32B 27/12* (2013.01); *B32B 37/00* (2013.01); *B32B 37/10* (2013.01); *B32B 37/1018* (2013.01); *B32B 37/1284* (2013.01); *B29C 65/00* (2013.01); *B29C 65/02* (2013.01); *B32B 37/06* (2013.01);
(Continued)

(58) Field of Classification Search
CPC ........ B29C 65/00; B29C 65/02; B29C 65/18; B29C 65/24; B29C 65/242; B29C 65/48; B29C 65/4835; B29C 65/32; B29C 65/524; B29C 65/525; B29C 65/78; B29C 65/7847; B29C 66/001; B29C 66/00145; B32B 5/00; B32B 5/022; B32B 5/024; B32B 5/026; B32B 7/12; B32B 9/047; B32B 37/06; B32B 37/1018; B32B 37/12; B32B 37/1207; B32B 37/1284; B32B 37/1292
USPC .......... 156/285, 286, 382; 264/511, 553, 566, 264/568, 571; 425/504, 388, 405.1, 405.2
See application file for complete search history.

(56) References Cited

U.S. PATENT DOCUMENTS 4,073,674 A * 2/1978 Hortel ........................... 156/285
4,501,541 A * 2/1985 Bethell et al. .................. 425/117
(Continued)

FOREIGN PATENT DOCUMENTS

EP 0670778 9/1995

OTHER PUBLICATIONS

Search Report for Denmark Patent Application No. PA 201000907, dated May 24, 2011, 1 page.

*Primary Examiner* — Richard Crispino
*Assistant Examiner* — Matthew Hoover
(74) *Attorney, Agent, or Firm* — Sheridan Ross P.C.

(57) ABSTRACT

Method for manufacturing a membrane material especially for use in the manufacturing of sails for sailboats and the like, where said method comprises the following steps:
a) distributing a first material layer on a vacuum table;
b) dispensing an adhesively coated yarn from a dispenser in a predefined pattern on said first material layer;
c) arranging a second material layer superposed the first material layer and the treads, thereby creating a membrane matrix;
d) passing a heating source across the matrix, thereby curing the adhesive applied to the yarn and laminating the membrane;
where the first material layer is provided with pin holes distributed across the first material layer, allowing the vacuum to traverse the first material layer.

7 Claims, 2 Drawing Sheets

(51) Int. Cl.
  *B32B 37/10* (2006.01)
  *B32B 7/04* (2006.01)
  *B32B 27/08* (2006.01)
  *B32B 27/12* (2006.01)
  *B32B 3/08* (2006.01)
  *B32B 3/26* (2006.01)
  *B32B 37/12* (2006.01)
  *B29C 65/02* (2006.01)
  *B29C 65/00* (2006.01)
  *B32B 37/06* (2006.01)

(52) U.S. Cl.
  CPC .... *B32B 2310/0825* (2013.01); *B32B 2605/12* (2013.01); *Y10T 428/24331* (2015.01)

(56) References Cited

U.S. PATENT DOCUMENTS

| | | | |
|---|---|---|---|
| 4,715,923 A * | 12/1987 | Knoll | 156/380.9 |
| 4,740,417 A * | 4/1988 | Tornero | 428/308.4 |
| 5,097,784 A * | 3/1992 | Baudet | 114/102.31 |
| 5,355,820 A * | 10/1994 | Conrad et al. | 114/102.31 |
| 5,868,990 A * | 2/1999 | Campbell | 264/328.12 |
| 6,281,183 B1 * | 8/2001 | Harbour | 510/406 |
| 6,311,633 B1 | 11/2001 | Keire | |
| 6,761,783 B2 * | 7/2004 | Keller et al. | 156/94 |
| 6,892,769 B2 * | 5/2005 | Hong | 141/65 |
| 8,168,703 B2 * | 5/2012 | Molta et al. | 524/63 |
| 2001/0021217 A1 * | 9/2001 | Gunther et al. | 374/178 |
| 2001/0023005 A1 | 9/2001 | Chapuis et al. | |
| 2002/0144774 A1 | 10/2002 | McReynolds | |
| 2010/0043689 A1 | 2/2010 | Madsen et al. | |

* cited by examiner

METHOD FOR MANUFACTURING A MEMBRANE MATERIAL

FIELD OF THE INVENTION

The present invention relates to a method for manufacturing a membrane material especially for use in the manufacturing of sail for sailboats and the like as well as a membrane manufactured according to the inventive method and furthermore to the use of such a membrane integrated into a sail.

BACKGROUND OF THE INVENTION

The art of sail-making has gone from sewing together sheets of canvas to panels of polymeric materials. Many modern sails are now made from exotic materials having a sandwich structure where the outer layers of the sandwich usually are made from some polymer material and sandwiched between the materials are a pattern of yarns. By arranging the yarns in specific patterns and selecting yarns made from strong materials, it is possible to guide the stress to which the sail is exposed in use to the claw, tack and head of the sail, such that by arranging the yarns in an optimum manner in the sail matrix, it is possible to manufacture very strong sails which at the same time are able to attain the desired curvature.

Typically, the material layers are made from polyester polyvinylidene halides polyurethanes or similar material, whereas the yarn is usually selected among aramids, carbon fibres, Mylar fibres, polyester or Dynema fibres. All these fibres are very strong, but as with all the materials mentioned previously they have a tendency to shrink and if they are made from different materials, the shrinkage is also different from material to material.

In the art, a method of manufacturing such a laminate material is suggested in U.S. Pat. No. 5,355,820 wherein a membrane table having a plenum provided with openings such that a vacuum may be established substantially across the entire table's plenum is provided.

In connection with the present invention it should be noted that the term vacuum is not to be construed as the scientific term vacuum, but merely covers the term under-pressure and sufficient under-pressure such that if a laminate or membrane is placed on the plenum of the vacuum table, the vacuum openings and the under-pressure supplied to the vacuum openings will be able to substantially fix the laminate relative to the plenum.

Along the longitudinal edges of the plenum, rails are provided such that a gantry spanning from one side of the plenum to the other may freely travel along the plenum of the table. The gantry is provided with a device for distributing the yarn in patterns across a first laminate fixated on the plenum via the vacuum openings as explained above. In order to maintain the yarns at a certain tension pegs or pins are provided such that as the yarn is made to change directions, this will occur around one or more pins/pegs. In this manner and by providing the yarns with an adhesive it is possible to provide the yarns in a specific pattern and with tension onto a first membrane. After having distributed the yarns in the desired pattern in order to provide the membrane material with the desired strength characteristics, an upper membrane material is provided on top of the yarns. After having placed the upper material, the laminate consisting of a lower material layer, the yarns and the upper material layer is exposed to pressure, for example supplied by a roller or by a vacuum bagging process. The roller is simply a large roller which is passed over the laminate while being heated such that the lamination process of the membrane is carried out by means of the roller and the heat.

In the vacuum bagging process a large foil is placed and sealed on top of the laminate, and a vacuum is applied to this foil which will then suck on to the laminate and thereby exert a certain pressure on the laminate. The process of removing air/gas trapped between the laminates or having the solvents used with the adhesive diffuse, is, however, difficult and time-consuming at best.

Typically, the laminates manufactured according to this process are later cut out in pre-designed panels which are assembled into the finished sail such that each panel will have desired properties for a specific position in the sail. In this manner it is possible to arrange the yarns in each panel such that the optimum force distribution will be provided without the sails having excessive strength and thereby excessive weight which is detrimental to sail handling and sailing characteristics overall. Also for cost considerations it is interesting only to use expensive exotic materials only where they are needed.

In an attempt to avoid using panels which need to be sewn together U.S. Pat. No. 5,097,784 proposes to create the sail in a single piece by distributing the laminates and the yarns on a mould having a convex or concave shape corresponding to the desired shape of the sail in the optimum use situation. In this process, however, it is very difficult to laminate the two layers sandwiching the yarns together in a reliable and sufficiently strong manner, but one advantage is that uninterrupted yarns and thereby optimum force distribution is achievable, but the laminate as such is relatively weak and very prone to manufacturing faults. Furthermore, due to the heat and pressure treatment during lamination, differential shrinkage, in the different materials will occur.

Common for the two processes mentioned above is the fact that they use a combination of heat and pressure in order to laminate the two materials together sandwiching the yarns. By heating the laminates, these will shrink whereby the dimensions of the finished membrane will be changed. Furthermore, if vacuum technique is used to fixate the laminate sheet in contact with the plenum or mould, this material layer will be less prone to shrink in that it is fixated by the vacuum openings in comparison to the upper layer which is simply laid out and in some prior art methods fixated by means of clamps or pegs along the edges of the sail in order to try to keep the shape stability as high as possible.

Furthermore, by applying pressure by means of rollers which is suggested for both the above-mentioned prior art methods the bulk of the pressure exerted by the rollers will be exerted onto the laminates where the yarns are present in that the material thickness in these places will be substantially thicker than the material thickness where no yarn is present such that the roller is very unlikely to ever effectively press/squeeze together the sheet materials as such, This of course potentially causes the finished sandwich material to have a weakened structure.

In EP 0670778 is also described a method of manufacturing a laminate sail where the problems relating to shrinkage, deformation etc. are addressed by providing the reinforcement filaments as extremely thin filaments such that the difference in thickness, especially between where two filaments cross each other and in positions where only the outer layers are present is reduced to a minimum such that the laminate may be created by an autoclaving process, heat and pressure or simply bonding.

This process, however, requires that the reinforcement yarns have a thickness of approximately 5 microns which requires special filaments, which are not commercially available. A further problem with these types of filaments is the fact that they may not be as well-proven both with respect to strength characteristics and with respect to long-time wear characteristics as the well-known and well-proven filaments/yarns.

OBJECT OF THE INVENTION

Consequently, it is the object of the present invention to provide primarily a method where the problems relating to shrink during curing are addressed such that a fully cured membrane of the types described above may be achieved with negligible shrinkage which also makes it possible to use larger panels and therefore fewer connections between the panels when assembling the panels to a finished sail.

DESCRIPTION OF THE INVENTION

The invention addresses this by providing a method for manufacturing a membrane matrix material especially for use in the manufacturing of sails for sailboats and the like, where said method comprises the following steps:
  a) distributing a first material layer on a vacuum table;
  b) dispensing an adhesively coated yarn from a dispenser in one or more predefined patterns on said first material layer;
  c) arranging a second material layer superposed the first material layer and the threads, thereby creating a membrane matrix;
  d) passing a heating source across the membrane matrix, thereby curing the adhesive applied to the yarn and laminating the membrane matrix;
where the first material layer is provided with pin holes distributed across the first material layer, allowing the vacuum to traverse the first material layer.

The fact that the first material layer is provided with pinholes is very important in this method which provides a novel and inventive membrane construction and membrane construction method. The term "membrane" used hereinafter also refers to the membrane matrix comprising the first and second material layers and threads.

In this connection "pinhole" shall be understood as very small holes which are big enough such that air, solvents and the like may pass through the hole, but which are small enough so that they do not have a detrimental effect on the membrane as such. When the second material layer is superposed the first material layer and the vacuum is applied across the plenum of the manufacturing table it is possible to "transfer" the vacuum to the second material layer that a vacuum almost as forceful as the vacuum exerted on the first material layer is exerted on the second material layer. Therefore, the second material layer is also fixed in the x-y direction in the same manner as the first material layer. When the membrane is heated and cured, the shrinkage which is normally associated with heat treatment of polymeric materials used for these types of membrane materials is fixed such that the shrinkage will occur in a z-direction perpendicular to the plane defined by the x- and y-directions. In this manner a stable shape and size membrane is created. The second material layer and first material layer thicknesses adjacent and superposed over the yarns will be slightly less due to the shrinkage in the layers, but for practical purposes this weakening of the material is offset by the adhesives present in this region.

In a further advantageous embodiment of the invention the vacuum means are initiated creating a vacuum distributed across the surface of the vacuum table, either before step a) or before step b) or before step d).

The various instances in which it is advantageous to initiate the vacuum means depend on the method as such and the materials which are to be used in the membrane forming method. By initiating the vacuum table before distributing the first material layer on the vacuum table, i.e. before step a), the first material layer will, as it is being distributed across the table, be fixed to the upper plenum of the table. This may be advantageous for very large layers where it is desirable to fix the layers instantly such that manipulation of the material will not affect the already dispensed material.

On the other hand, initiating the vacuum means before step b) (and after step a)) this situation allows manipulation of the material placed on the plenum of the table before the material is fixated to the plenum. This may be advantageous where more separate sections of material, for example of different material types, or for other reasons need to be placed on the plenum. Also for very large material pieces it may be advantageous to manipulate the material before it is fixed to the plenum of the table by the vacuum means.

Finally, initiating the vacuum means before step d), i.e. before the adhesive and curing materials in the material layers are activated, allows manipulation of the second material layer relative to the first material layer before this is fixed. This is of course advantageous in embodiments of the method where it is desirable to for example place a different type of material on top of the firstly disposed material layer.

In a further advantageous embodiment the vacuum after step a) is set at between 0.1 and 0.5 bars, and that the vacuum after step c) is increased to between 0.6 to 1 bar.

By increasing the vacuum after the first material layer has been placed on the vacuum table, the pinholes in the first material layer will act as the new surface of the vacuum table. This new surface and the vacuum transferred through the first material layer serve at least two purposes. The first purpose is to evacuate any fumes or gasses being released by the layer itself and by the adhesive applied to the yarns dispensed on the first material layer. It is therefore not necessary to provide extra ventilation in that the pinholes in the first material layer will act as ventilation positioned immediately adjacent to where the possibly noxious fumes and gasses are released from the adhesive covering or in the yarn.

Vacuum in the range between 0.1 and 0.5 bars is not so severe that it becomes impossible to handle the second material layer when this second material layer is superposed the first material layer, and yet the vacuum is sufficient to fixate the first layer, so that it is not influenced by the manipulation of the second material layer. As the second material layer is correctly positioned, it is advantageous to increase the vacuum such that the pinholes will now act as a vacuum surface thereby fixing the position of the second material layer relative to the first material layer. With the vacuum in the range between 0.6 and 1 bar the shrinkage which will occur as heating is applied to the sandwich structure will not be able to displace the first and second material layers relative to each other whereby any shrinkage which occurs, occurs in a direction perpendicular to the plane of the vacuum table, i.e. the x-y plane.

A further advantage of the pinholes provided in the first material layer and thereby allowing vacuum to be present in the space between the first and second material layers (which is not a space at all, but filled with membrane material) is the fact that as the curing commences, any air or gas (from evaporating solvents) or the like trapped between the two layers will effectively be vented out such that a completely homogenous membrane matrix is created. For the prior art methods using vacuum bagging processes the distance a trapped bubble of air or gas has to travel, for example from the centre of the layer to an edge across sections in the material where a yarn is present such that a substantially close barrier occurs firstly takes a very long time and secondly is often impossible due to the pressure exerted by the vacuum bagging which is the whole concept of vacuum bagging in forcing the two material layers together during the curing process. Therefore, the pinholes distributed across the first material layer effectively shorten the route which a bubble has to travel to such an extent that a substantially flawless membrane matrix is manufactured.

In a still further advantageous embodiment of the invention the vacuum table is substantially horizontal, and the table's plane defines an X and a Y axis, and rails are arranged along two opposing sides of the table parallel to the Y axis and a first gantry is arranged for movement along the rails, which first gantry spans across the table parallel to the X axis, where an array of heating means are arranged along the first gantry in the X axis direction, said heating means directing their energy towards the table.

From the prior art mentioned previously it is known to use vacuum tables having a plenum in the X-Y plane. However, what is not illustrated from the prior art is the fact that a dedicated heating gantry is provided. With the prior art methods the roller which exerts pressure during the lamination process also provides the necessary heating. As the roller passes the laminate it will exert a relatively high pressure, but only for a short period of time. But as already mentioned above the disadvantages by using a roller therefore necessitate that other means for heating and thereby effecting the lamination process be provided.

With the present invention by providing a first gantry comprising an array of heating means it is possible to distribute the heating energy very evenly and precisely to the material placed on the table's X-Y plane. Furthermore by adjusting the travelling speed of the gantry along the table, the length of time the material is exposed to the desired temperature is also controllable.

In a still further advantageous embodiment a plurality of temperature sensors are arranged along the length of the first gantry, which temperature sensors are connected to a control device, which control device in response to input from the temperature sensors controls the array of heating means, such that minimal temperature differences occur in the matrix.

In this manner it becomes possible to control the array of heating means such that each heating means may be controlled in a manner where the exact heating needs of the material in that particular area is addressed without affecting the heating in other areas such that the optimal heating process depending on the material's ability to absorb the heating energy is addressed across the first gantry. Depending on the density of the yarns distributed on the material the material's ability to absorb heat or the need to absorb heat in order to provide a complete curing/lamination of the materials varies across the membrane. Therefore, by optimizing the heating process it is possible to supply sufficient energy depending on the material's ability to absorb the energy across the material due to the provision of the temperature sensors and the control device such that an optimal temperature distribution in the material may be achieved.

In a still further advantageous embodiment a second gantry is arranged parallel to the first gantry for travel on the rails along the sides of the table, where said second gantry is provided with means for allowing a yarn dispensing device to travel along the X axis of the second gantry, where said yarn dispensing device deposits an adhesively coated yarn in a predetermined pattern on said first material layer.

The second gantry positions the yarn according to a predetermined pattern usually calculated in order for that particular part of the sail where the yarn is dispensed to be able to absorb the forces which the sail will be exposed to in that particular region. As the gantry may travel along the vacuum table and furthermore that the dispensing device travels in the X-direction, i.e. perpendicular to the gantry's travelling direction, it is possible to position the yarn dispensing device in any position above the vacuum table.

Naturally the second gantry travels along the plenum distributing the yarn in the desired pattern, after the first material layer have been positioned on the plenum, and before the second material layer is placed.

In a further advantageous embodiment the heating means are infrared heating lamps, and where the control device provides constant voltage and current to the heating means, where input from the temperature sensors is used to pulsate the heat, such that the temperature in the core of the yarns are controlled between 115° C. and 150° C.

By controlling the temperature in the core of the yarns, which yarns are saturated by adhesive, it is possible to provide the majority of the heat directly to the yarns such that the hot-melt adhesive will be heated to a viscosity where it is ensured that it will flow optimally in order to distribute the adhesive both in the yarn and in the vicinity of the yarn such that a strong and homogenous membrane is provided.

Furthermore, by providing constant voltage and current to the heating means and regulating by pulsating the power to the infrared heating sources it is achieved that a simple and yet very effective manner of controlling the heat is provided.

In a still further advantageous embodiment of the invention the temperature on the surface of the yarn is slightly higher than the temperature in the core of the yarn. In this manner it is ensured that the adhesive is brought to flow in the space between the two material layers such that the adhesive is optimally distributed between the two layers and around the yarn. Furthermore, the adhesive will, to a certain degree close the pinholes in the lowermost material layer as the adhesive flows from the adhesive coated yarns.

The adhesives which are typically used with this type of process is a so-called hot-melt, i.e. the adhesive will be heated to a certain temperature whereby it achieves a low viscosity (high flowability) and at the same time the adhesive properties of the usually polymer-based adhesive are activated such that the cross-bonding of the polymers which creates the adhesive bond are initiated. During this process solvents in the adhesive will be released which, with the inventive method and especially the provision of pinholes in the lower membrane will be evacuated. The gas will therefore not create pockets in the cured membrane, which would otherwise be the risk with the prior art methods.

These air pockets have historically shown to be the initial point where delamination of material layers of this type arises, and as such it is advantageous to make sure that no such air pockets are present.

With the prior art methods the lamination process as already described above is either facilitated by a hot roller which exerts pressure and heats the laminate in order to activate the adhesives and at the same time force the two material layers together around the yarns. In this process the developed gas has very little chance of escaping, and as such the formation of gas pockets is relatively high. With the vacuum bagging process a certain amount of gas will be evacuated due to the vacuum, but especially for larger sail panels, the travelling distance for a gas bubble may be several meters, and it is unlikely that the vacuum bagging process will be able to effectively evacuate all developed gas. With the present invention, however, pinholes may be provided every 15 by 15 millimeters such that the developed gas only has to travel approx. 11 millimeters, i.e. the maximum distance between two adjacent pinholes.

Furthermore, by using the heating source in the shape of a heated roller the heat distribution through the material layers is very poor, in that the heat gradient decreases drastically from the point of impact between the roller and the topmost material layer and the lowermost material layer in contact with the vacuum table. For this reason the adhesive will find it difficult in the bottom to achieve the flow characteristics which will guarantee an optimal distribution of the adhesive on the surface of the lowermost material layer. In this connection it should also be taken into account that it is not possible just to increase the temperature of the roller in that the materials typically will be damaged if the temperature of the roller is substantially above 140° C.

With the present invention, where the heating due to the infrared heating sources are provided directly on the yarns/inside the yarns the adhesive is activated substantially evenly whereby all the adhesive will achieve optimum flow characteristics such that all the adhesive is activated at the same time and furthermore the adhesive is distributed due to the pressure from the vacuum table evenly across the entire material layer surface such that a very homogenous and reliable lamination process and thereby a substantially faultless membrane is achieved. Also with the vacuum table in combination with the pinholes makes it possible to establish an even pressure across the entire material layer, and maintain an even pressure for as long as it may be desired, i.e. until the source of vacuum is switched off. In the roller method, the pressure is only present when the roller passes a specific point/zone.

The invention is also directed to a membrane matrix comprising two material layers and a distributed yarn sandwiched between said material layers manufactured according to any of the inventive embodiments described above.

Furthermore, the invention is also directed at the use of such a membrane matrix, where the membrane matrix constitutes the entire sail or a panel in a sail used in a sail for a craft, vessel or vehicle.

In conclusion, the inventive method utilises pinholes in the first material layer in order to fixate the second material layer. In this manner shrinkage/crimp is eliminated in the plane of the membrane matrix (i.e. the x and y directions) whereby the shrinkage/crimp which will occur during the curing of the membrane is only allowed in the z-direction (perpendicular to the plane of the membrane). Secondly, the pinholes provides vacuum between the two material layers, such that air and evaporating gasses (possible toxic) from the hot-melt, are evacuated very close to where they occur. This has two main advantages: firstly these gasses are vented away close to the source such that workers are not exposed to these gasses, whereby the working environment is improved, and secondly, the possibility of creating air/gas pockets, and thereby faults in the membrane is substantially eliminated.

DESCRIPTION OF THE DRAWING

The invention will now be explained with respect to the accompanying drawing wherein.

DETAILED DESCRIPTION OF THE INVENTION

Figure 1:
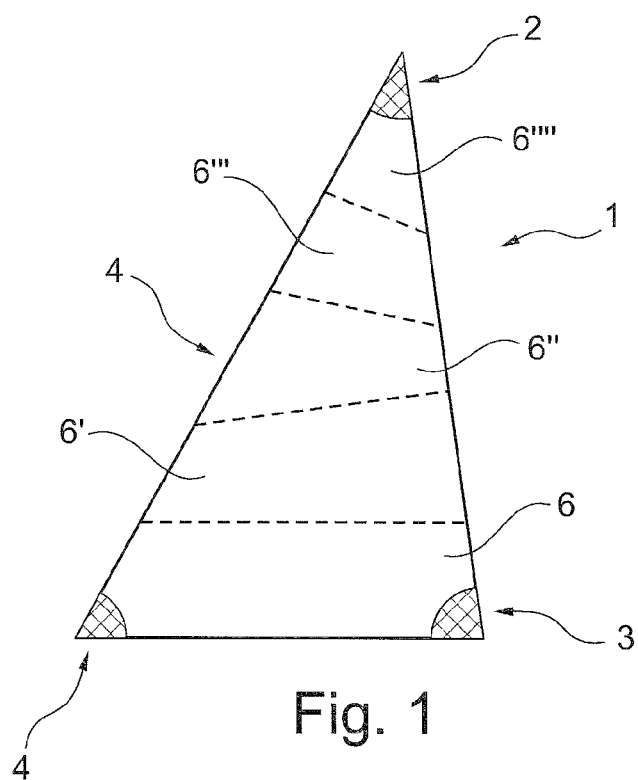
FIG. 1 illustrates a sail

In FIG. 1 is schematically illustrated a sail, for example a foresail 1. In a traditional manner a foresail is provided with a head of sail 2, a claw 3 and a tack 4. In these points the sail is suspended on the sailboat, such that by tensioning the luff 5 between the head of the sail 2 and the tack 4 the front of the sail is maintained as a substantially straight line which is the optimum for, for example foresails. A sheet is connected to the claw such that the angle of the sail may be adjusted relative to the wind. In this embodiment the sail is constructed from various panels 6, 6', 6", 6'", 6"" where each panel has a special strength configuration (not illustrated) in order to address the stresses which may be introduced into the sail 1 during sailing. Furthermore, the panels have different shapes such that the sail may be given the optimum shape due to the variation in the panel's shape.

It is an object of the present invention to provide a method to produce improved sails and in particular to manufacture sail panels 6 which are of improved quality due to the inventive method.

For this purpose modern sails are made from two material layers, one on each side of the sail and sandwiched between the material layers is a yarn. The yarn may be selected among a variety of yarns made from various materials, each exhibiting special strength characteristics such that depending on the price and strength, a sail may be designed for a particular purpose.

Figure 2:
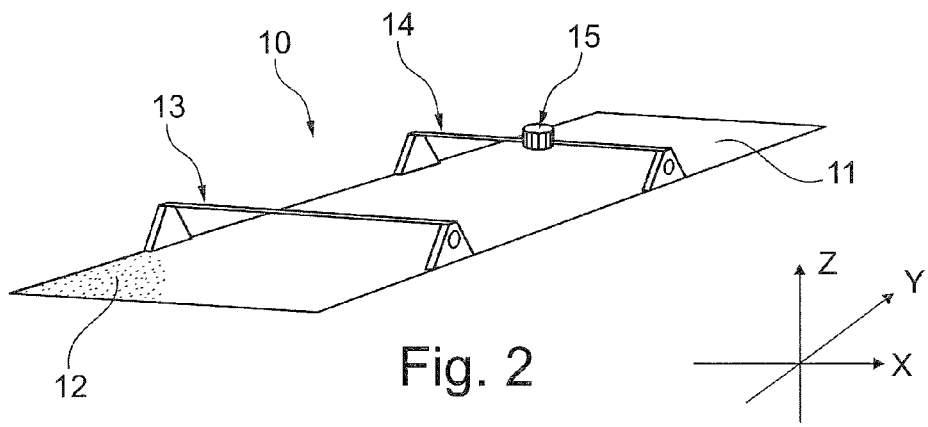
FIG. 2 illustrates a vacuum table

When manufacturing a sail according to the present invention a vacuum table 10 as illustrated in FIG. 2 is used. The vacuum table comprises a plenum 11 which defines an X-Y plane. The plenum is provided with a large number of apertures illustrated generally by the reference number 12 such that it is possible to provide a vacuum substantially over the entire surface of the plenum 11. In FIG. 2 are only schematically indicated openings 12 in a portion of the table, but this is merely for illustrative purposes. The openings will be provided across the entire plenum's surface.

Along the sides of the plenum 11 are provided rails (not illustrated) such that a first and second gantry 13, 14 may travel along the length of the vacuum table 10.

The first gantry will be explained in further detail with reference to FIG. 3, but the first gantry is provided with heating sources as well as sensors such that the heating sources may be brought into any position along the plenum.

The second gantry 14 is provided with means 15 for dispensing the yarn onto the first material layer and the means 15 may travel freely along the gantry 14 in the X-direction. Therefore, as the gantry is movable in the Y-direction, the dispensing means 15 may be positioned in any desired position in the X-Y-plane such that the yarn may be distributed in any desired pattern on the first e material layer.

Figure 3:
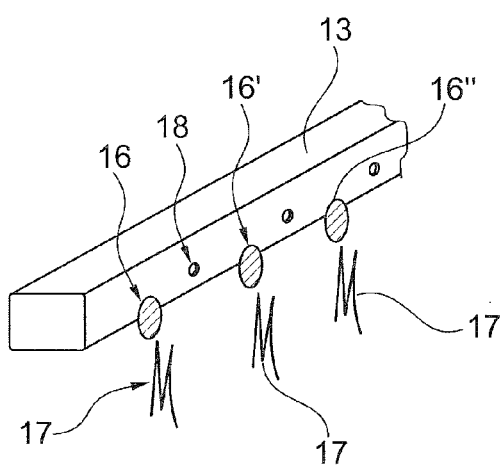
FIG. 3 illustrates a section of a gantry

A section of the first gantry 13 is illustrated in FIG. 3, where for illustrative purposes three substantially identical heating sources 16, 16', 16" are provided at a mutual distance substantially evenly distributed along the length of the gantry 13. In practice more heating sources will be distributed along the gantry.

Any number of heating sources may be utilised with the invention, as well as other types of heating sources than the one mentioned in connection with the preferred embodiment may be used, such as for example microwave sources. However, only mentioning microwave and infrared heating sources shall not be construed as a limitation, in that any suitable heating source may be used.

The heating sources are preferably infrared heating devices or microwave sources which are able to direct their heating energy 17 towards the plenum of the vacuum table 10. Furthermore, in this embodiment the gantry 13 is provided with heat sensors 18 which are situated adjacent the heating means 16. In this embodiment each heating means 16 is provided with/associated with a sensor immediately adjacent the heating means in order to detect the temperature in the membrane matrix created by activation of the heating source 16. For other purposes a larger or smaller number of heating sensors may be provided in order to control the heating/curing process of the material.

The heating sources in this embodiment being infrared heating sources are provided with a constant current and voltage, and by pulsating the energy supply, the heat transferred to the materials may be adjusted according to input from the sensors 18.

Figure 4:
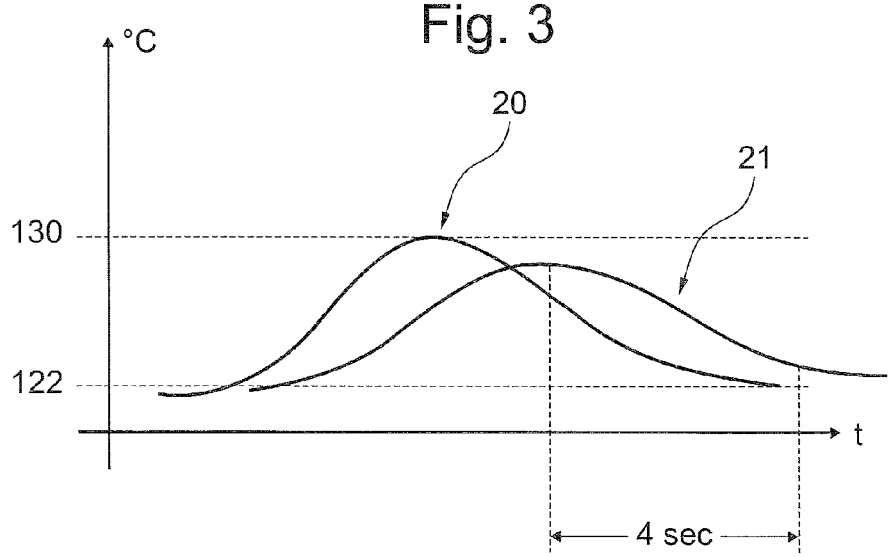
FIG. 4 illustrates a desirable heating cycle

In FIG. 4 is illustrated a desirable heating cycle. A heating cycle is in this context to be construed as the heat build-up in a yarn as the first gantry 13 passes a yarn or passes a section of a yarn. FIG. 4 therefore illustrates the heat build-up and the heat dissipation for a particular segment of yarn.

In order not to damage the materials the optimal temperature has a maximum of approx. 130° C., and as the heating source travels on, the temperature will decline in that particular point. The two curves 20, 21 illustrate the temperature variation in the yarn where the curve 20 illustrates the temperature build-up on the surface of the yarn whereas the curve 21 illustrates the temperature build-up in the core of the yarn. By adjusting the wavelength of the infrared heating source it is possible to control the heating source such that the infrared waves will penetrate the yarn to the desired depth such that a heating procedure as illustrated in FIG. 4 may be achieved. In this manner the adhesive on the surface of the yarn will be flowable before the adhesive in the core of the yarn such that the adhesive exposed to the temperature illustrated with the curve 20 will flow away from the yarn and distribute itself between the two material layers whereby the adhesive in the core of the yarn will attain its flowable characteristics a little bit later, and therefore be able to freely flow out and distribute itself in the vicinity of the yarn.

The decline in temperature is due to the heating source 16 passing the particular segment, and typically with the working speeds, i.e. the travelling speed of the gantry the decline from approx. 130° C. to 122° C. is approx. 4 seconds. The 122° C. is interesting in that the hot-melt used in this particular embodiment is activated above 120° C. and reaches its lowest viscosity at approx. 130° C. such that during the 4 seconds passage of the gantry the adhesive is distributed, and the curing process is initiated. At the same time the vacuum forcing the two material layers together exerts a pressure substantially across the entire surface such that an even distribution of the adhesive is achieved.

Figure 5:
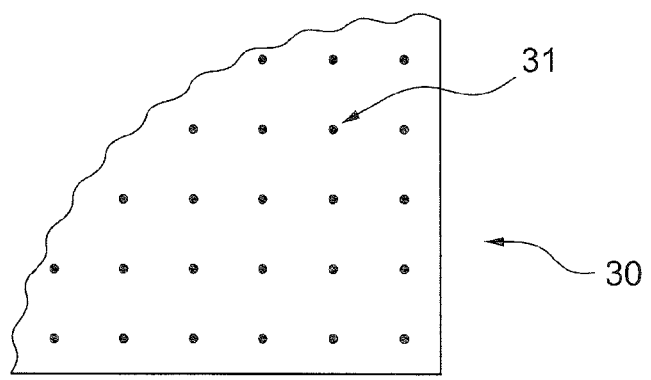
FIG. 5 illustrates a corner of the first membrane material

Turning to FIG. 5 a corner of the first material layer 30 is illustrated. The material is typically a polymer-based membrane which is provided with a pattern of pinholes 31. In this embodiment the pinholes are arranged in a substantially regular pattern across the entire first material layer 30 such that the distance between two adjacent pinholes is approx. 15 millimeters. It is to be noted that the pinholes may be distributed differently and have a different mutual distance, but during tests with the apparatus it was found advantageous to provide the pinholes approx. every 15 millimeters as illustrated. The diameter of each pinhole is approx. 0.5-1.5 millimeters.

Figure 6:
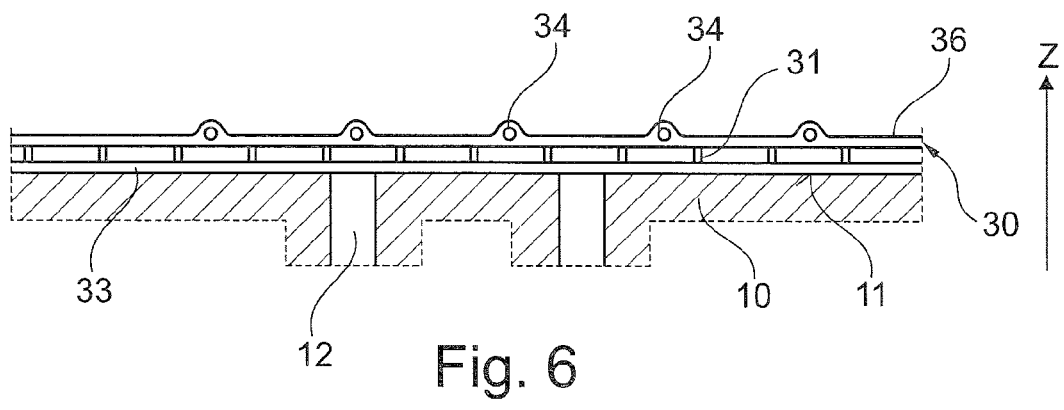
FIG. 6 illustrates how a felt layer may be placed on the vacuum table between the surface of the vacuum table and the first material layer.

The inventive method is carried out by placing the first material layer 30 on the plenum 10. In order to distribute the vacuum substantially evenly across the plenum a thin felt layer 33 may be placed on the vacuum table between the surface of the vacuum table and the first material layer 30 as illustrated with reference to FIG. 6.

According to the method the first material layer 30 is arranged on the plenum 11 such that the vacuum openings 12 will be exerting an under-pressure on the first material layer 30 whereby the first material layer 30 will be fixed relative to the plenum 11. Even by inserting a thin felt layer 33 between the first material layer 30 and the plenum 11 the first material layer 30 will be substantially fixed. By providing pinholes 31 the vacuum means creating under-pressure in the vacuum openings 12 will suck air through the pinholes 31 in the first material layer 30. Initially the vacuum source is adjusted such that the under-pressure will be between 0.1-0.5 bars. Typically, an under-pressure of 0.3 bars is sufficient to fixate the first material layer 30.

Next step in the process is to activate the second gantry and dispense the yarn by the dispensing means 15 in a pre-determined pattern across the first material layer 30. The predetermined pattern is usually designed in a computer, and the pattern is transferred to a controlling computer which will control the movements of the dispensing means and the gantry 14 such that the yarn is distributed according to the computer design. The yarns 34 are coated in an adhesive and will be distributed on the top surface of the first material layer 30.

After having distributed the yarns 34 on top of the first material layer 30, the second material layer 36 is arranged on top of the yarns 34 and the first material layer 30. The relatively low under-pressure will substantially fixate the second material layer 36 relative to the first material layer 30, and when the second material layer 36 is in its correct position, the vacuum is increased such that the under-pressure in the vacuum openings 12 will be increased to an under-pressure of between 0.6-1 bar. With this under-pressure the second material layer 36 is completely fixated relative to the first material layer 30 such that it will not be possible with the forces to which the layers are exposed during the curing process to move neither in the Y- nor in the X-direction. Therefore, a dimensionable, stable material is provided.

At this point the first gantry is activated and thereby also the heating sources 16, the heating sensors 18 etc. and the gantry is made to pass along the plenum 11 heating the adhesive in which the yarns 34 are coated thereby distributing the adhesive between the two material layers 30, 36 and at the same time activating the hot-melt in order to initiate the cross-bonding process in the polymer-based hot-melt which will create the adhesive forces whereby the first and second material layers will be securely bonded to each other. During this process, especially the heating process, the polymer materials will shrink. However, due to the fixation of the material layers caused by the under-pressure partly from the vacuum openings 12 in the plenum and further distributed to the second material layer 36 due to the provision of the pinholes 31 in the first material layer 30 the materials are not able to shrink in the X-Y-direction, and therefore any shrinkage which occurs in the material layers will occur in the said direction, i.e. in a direction perpendicular to the plenum 11.

At the same time as the heating and thereby curing of the layers occur, the vacuum will exert a substantially even pressure due to the distribution of the under-pressure through the pinholes 31 such that the entire membrane matrix is exposed to an even pressure. Also, any air or gas developed during the curing process, for example from evaporating solvents, will be evacuated through the pinholes and the vacuum openings 12 whereby the process will not let any potentially toxic gasses free in the immediate environment which therefore also provides an improved working environment.

An embodiment of the invention has now been explained with reference to the accompanying drawings, but it is clear that variations are possible within the scope of the appended claims.

The invention claimed is:

1. A method for manufacturing a membrane material in the manufacturing of sails for sailboats, said method comprising:
   a) distributing a first membrane material layer of a sail on a vacuum table and fixing the first membrane material layer in x and y directions by applying a vacuum across the surface of the vacuum table;
   b) dispensing an adhesively coated yarn from a dispenser in a predefined pattern on said first material layer of the sail;
   c) fixing a second membrane material layer of the sail in x and y directions superposed on the first membrane material layer of the sail and the adhesively coated yarn, thereby creating a membrane matrix of the sail by applying the vacuum across the surface of the vacuum table, such that the vacuum works across the membrane matrix to prevent the first and second material layers from shrinking in the x and y directions; wherein the first membrane material layer of the sail includes pin holes distributed across the first membrane material layer in a substantially regular pattern, allowing the vacuum to traverse the first membrane material layer to remove gas trapped between the first and second material layers of the sail thereby creating a homogenous membrane matrix; and
   d) passing a heating source across the membrane matrix, thereby curing the adhesive applied to the adhesively coated yarn and thereby laminating the membrane matrix; and
   wherein applying the vacuum before step d is increased as compared to the vacuum before step b.

2. A method according to claim 1 wherein:
the vacuum before step b is set at between 0.1 and 0.5 bars, and the vacuum before step d is increased to between 0.6 to 1 bar.

3. A method according to claim 1 wherein:
the vacuum table is substantially horizontal, a plane of the vacuum table defines an X and a Y axis, rails are arranged along two opposing sides of the vacuum table parallel to the Y axis, and a first gantry is arranged for movement along the rails, said first gantry spanning across the table parallel to the X axis, said heating source including an array of heating means arranged along the first gantry in a direction of the X axis, said heating means directing energy towards the vacuum table.

4. A method according to claim 3 wherein:
a plurality of temperature sensors are arranged along a length of the first gantry, said temperature sensors being connected to a control device which, in response to input from the plurality of temperature sensors, said control device controls the array of heating means such that minimal temperature differences occur in the membrane matrix.

5. A method according to claim 3 wherein:
a second gantry is arranged parallel to the first gantry for travel on the rails along the opposing sides of the table, said second gantry being provided with means for allowing the dispenser to travel along the X axis of the second gantry, wherein said dispenser deposits the adhesively coated yarn in a predetermined pattern on said first material layer.

6. A method according to claim 4 wherein:
the array of heating means are infrared heating sources, the control device provides a constant voltage and current to the array of heating means, wherein an input from the plurality of temperature sensors is used to pulsate heat provided by the array of heating means such that a temperature in a core of the adhesively coated yarn is controlled between 115° C. and 150° C.

7. A method according to claim 6 wherein:
a temperature of the adhesively coated yarn is controlled such that a temperature on a surface of the adhesively coated yarn is slightly higher than a temperature in a core of the adhesively coated yarn.

* * * * *